United States Patent
Suzuki

(10) Patent No.: US 9,042,283 B2
(45) Date of Patent: May 26, 2015

(54) WIRELESS COMMUNICATION APPARATUS, METHOD OF CONTROLLING SAME AND STORAGE MEDIUM

(71) Applicant: CANON KABUSHIKI KAISHA, Tokyo (JP)

(72) Inventor: Motoharu Suzuki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 100 days.

(21) Appl. No.: 13/829,362

(22) Filed: Mar. 14, 2013

(65) Prior Publication Data

US 2013/0215829 A1   Aug. 22, 2013

Related U.S. Application Data

(63) Continuation of application No. 12/890,583, filed on Sep. 24, 2010, now Pat. No. 8,416,722.

(30) Foreign Application Priority Data

Oct. 27, 2009   (JP) ................................ 2009-247106

(51) Int. Cl.
   *H04W 48/20*      (2009.01)
   *H04L 12/413*     (2006.01)
   *H04L 12/24*      (2006.01)

(52) U.S. Cl.
   CPC ............. *H04W 48/20* (2013.01); *H04L 12/413* (2013.01); *H04L 41/5022* (2013.01)

(58) Field of Classification Search
   CPC ...... H04W 12/08; H04W 48/16; H04W 48/20
   See application file for complete search history.

(56) References Cited

U.S. PATENT DOCUMENTS

| | | | |
|---|---|---|---|
| 5,127,029 A | 6/1992 | Suzuki et al. | |
| 5,841,862 A * | 11/1998 | Obayashi et al. | 455/424 |
| 6,044,104 A * | 3/2000 | Watanabe | 375/142 |
| 6,757,422 B1 | 6/2004 | Suzuki et al. | |
| 6,856,341 B2 | 2/2005 | Suzuki | |
| 6,927,955 B2 | 8/2005 | Suzui et al. | |
| 6,944,143 B1 * | 9/2005 | Bayley et al. | 370/332 |

(Continued)

FOREIGN PATENT DOCUMENTS

| | | |
|---|---|---|
| JP | 2002-26931 A | 1/2002 |
| JP | 2006-140705 A | 6/2006 |

(Continued)

OTHER PUBLICATIONS

Fukuda, "Decentralized access point selection architecutre for wireless lan", wireless tele. symposium 2004, May 2004, pomona Calif. USA.*

*Primary Examiner* — Fan Ng
(74) *Attorney, Agent, or Firm* — Fitzpatrick, Cella, Harper & Scinto

(57) ABSTRACT

Efficient selection of an access point is performed in accordance with quality of service of wireless communication required for a wireless communication apparatus. To achieve this in a wireless network system that uses a plurality of access points, the access point suited to the quality of service of wireless communication required by the wireless communication apparatus is selected automatically when the access point to which the wireless communication apparatus will be connected is selected.

10 Claims, 10 Drawing Sheets

(56) References Cited

U.S. PATENT DOCUMENTS

| | | | |
|---|---|---|---|
| 7,526,257 B2 * | 4/2009 | Ogura | 455/78 |
| 7,639,637 B2 * | 12/2009 | Honjo et al. | 370/310.2 |
| 8,149,758 B2 * | 4/2012 | Shoji | 370/315 |
| 2002/0025810 A1 | 2/2002 | Takayama | |
| 2009/0088164 A1 * | 4/2009 | Shen et al. | 455/436 |
| 2009/0310583 A1 | 12/2009 | Suzuki | |
| 2010/0054121 A1 * | 3/2010 | Sakai | 370/221 |

FOREIGN PATENT DOCUMENTS

| | | |
|---|---|---|
| JP | 2007-110373 A | 4/2007 |
| JP | 2007-165980 A | 6/2007 |
| JP | 2008-5019 A | 1/2008 |
| JP | 2008-042922 A | 2/2008 |

* cited by examiner

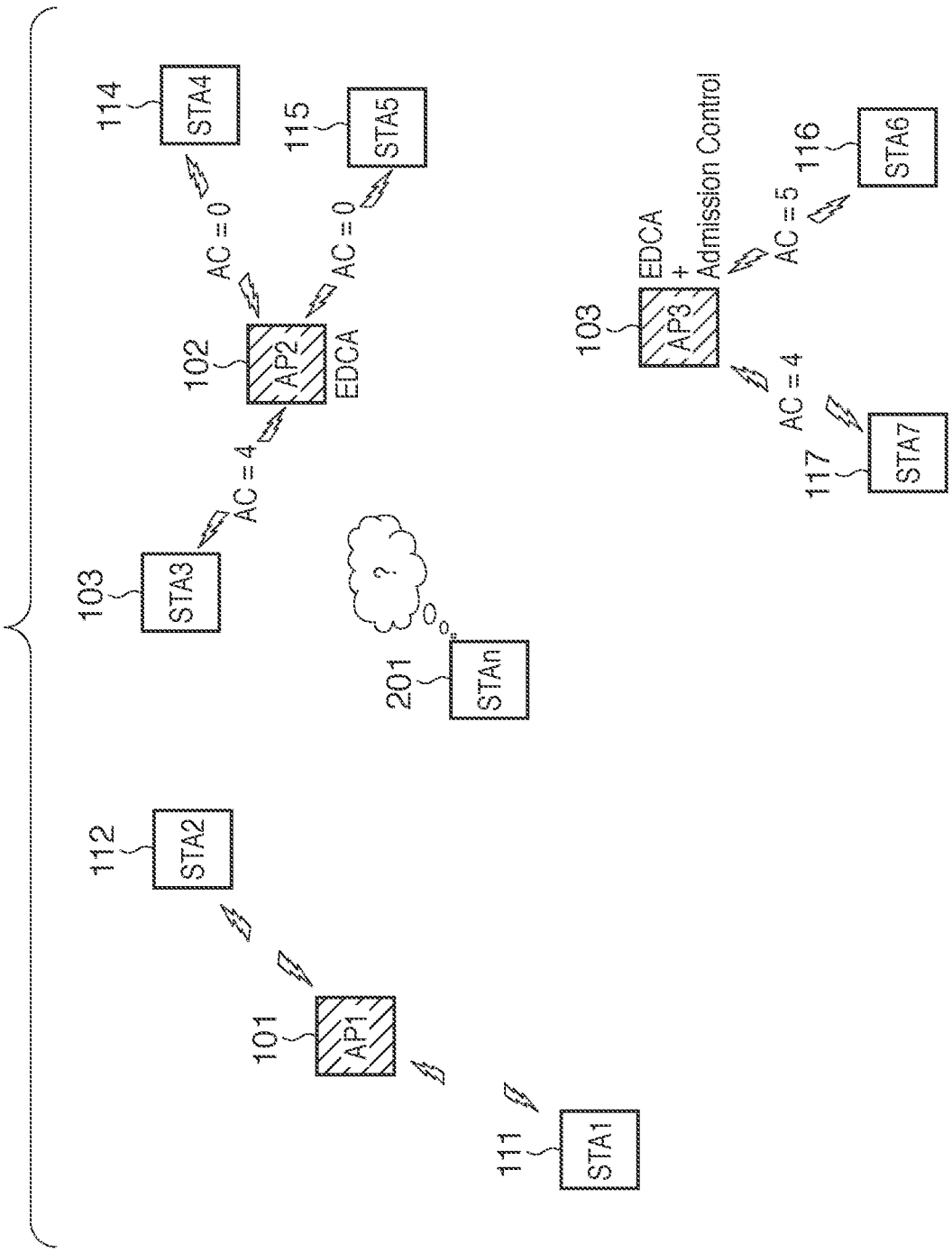

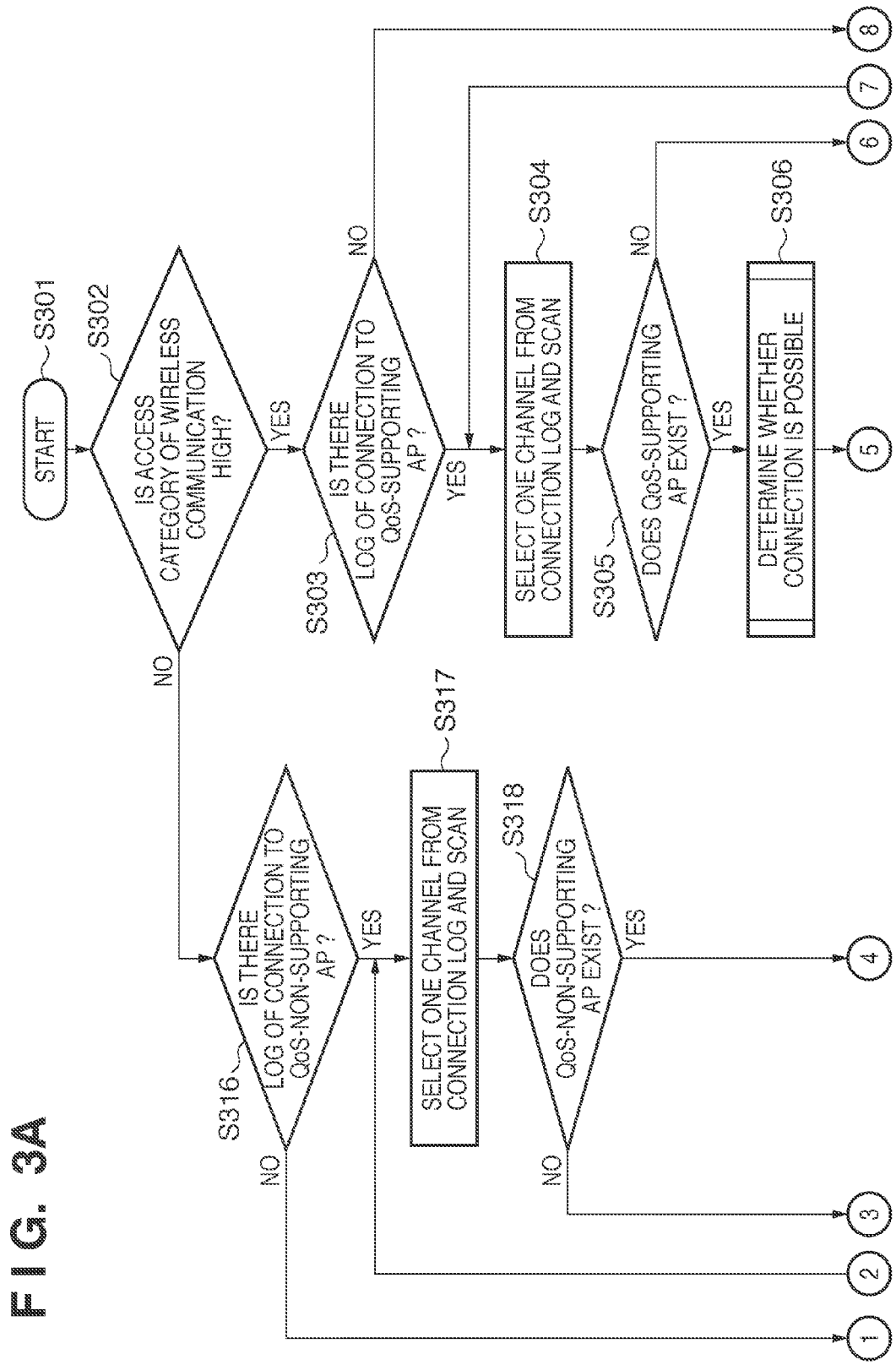

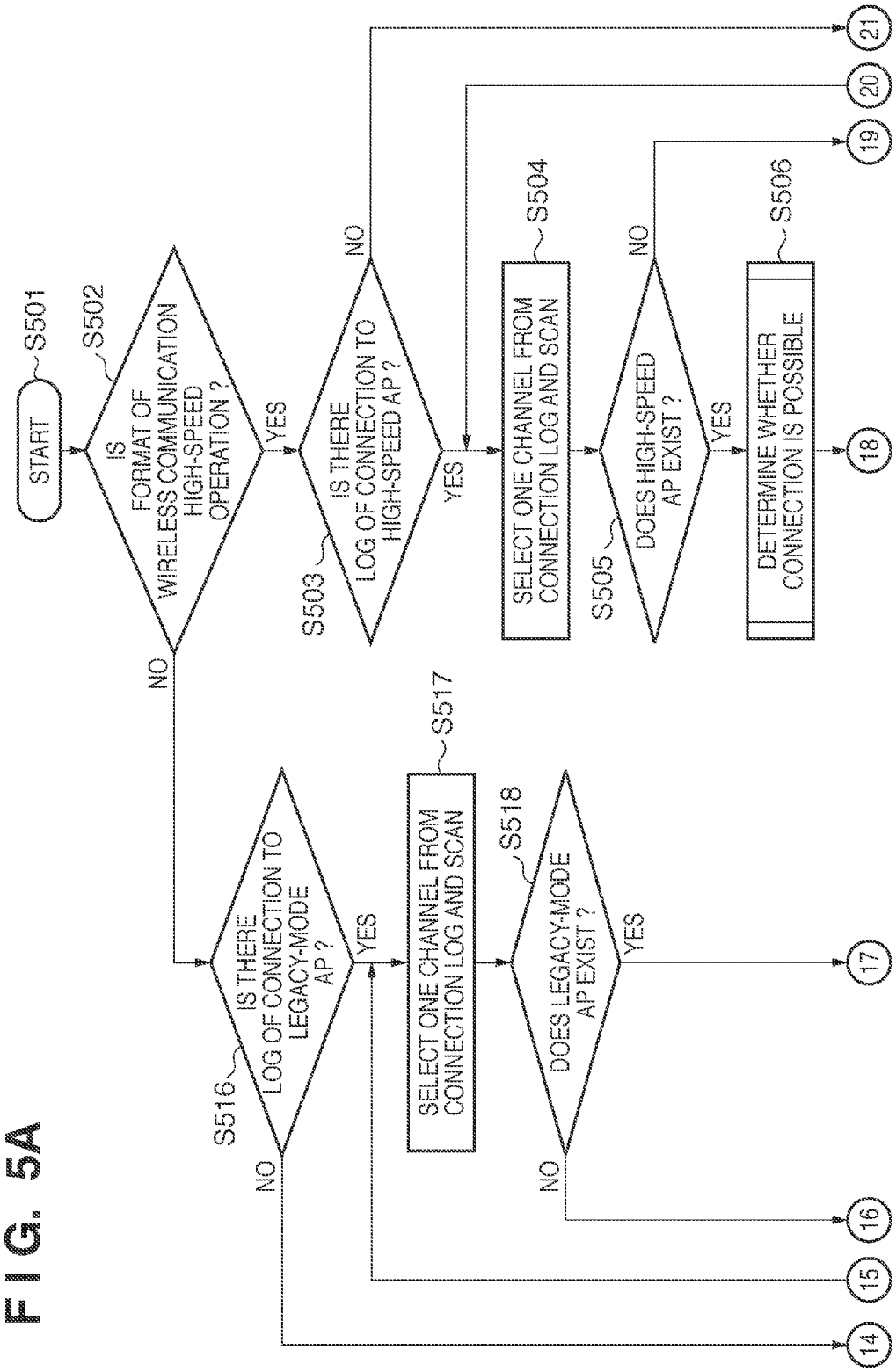

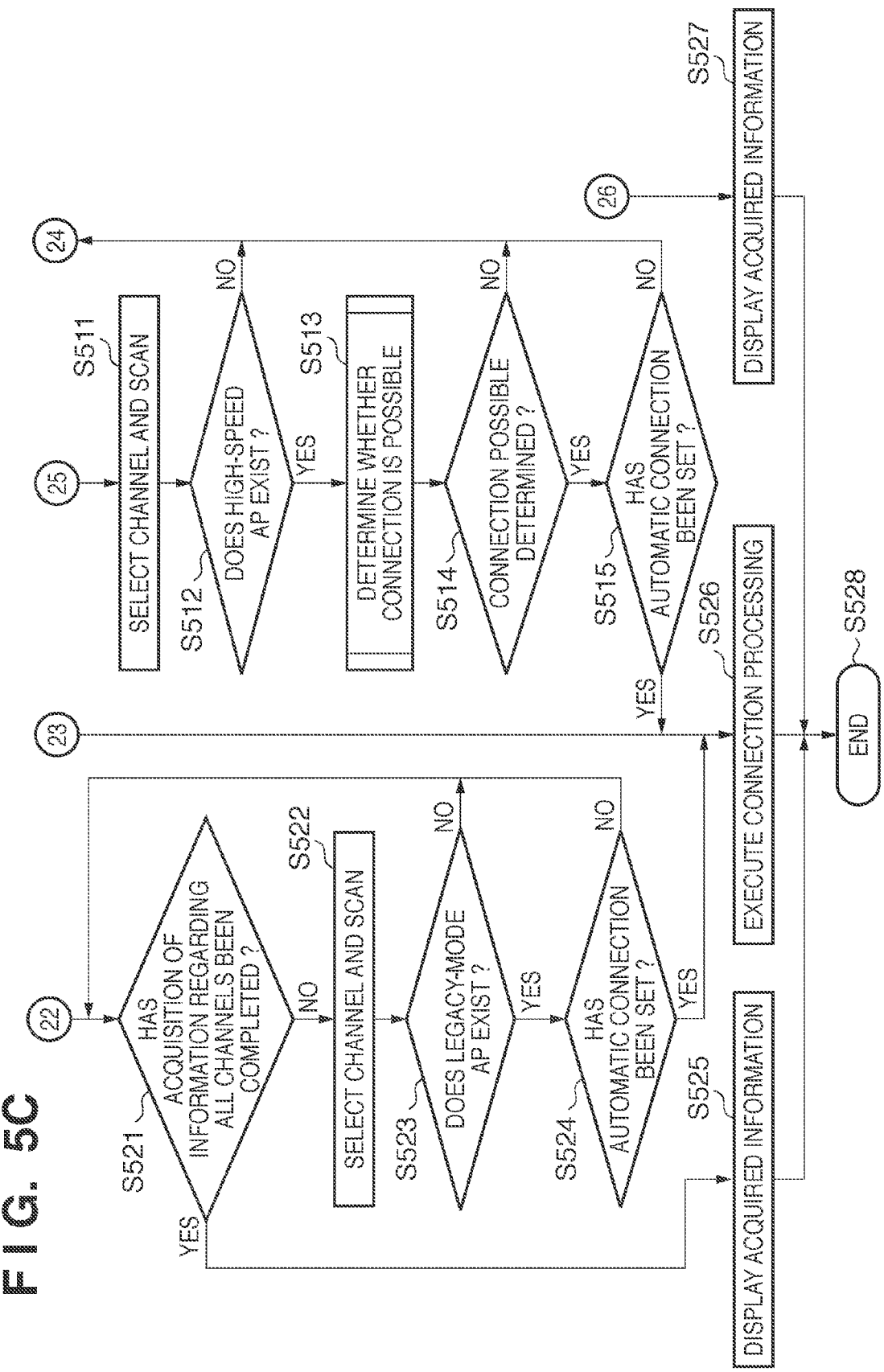

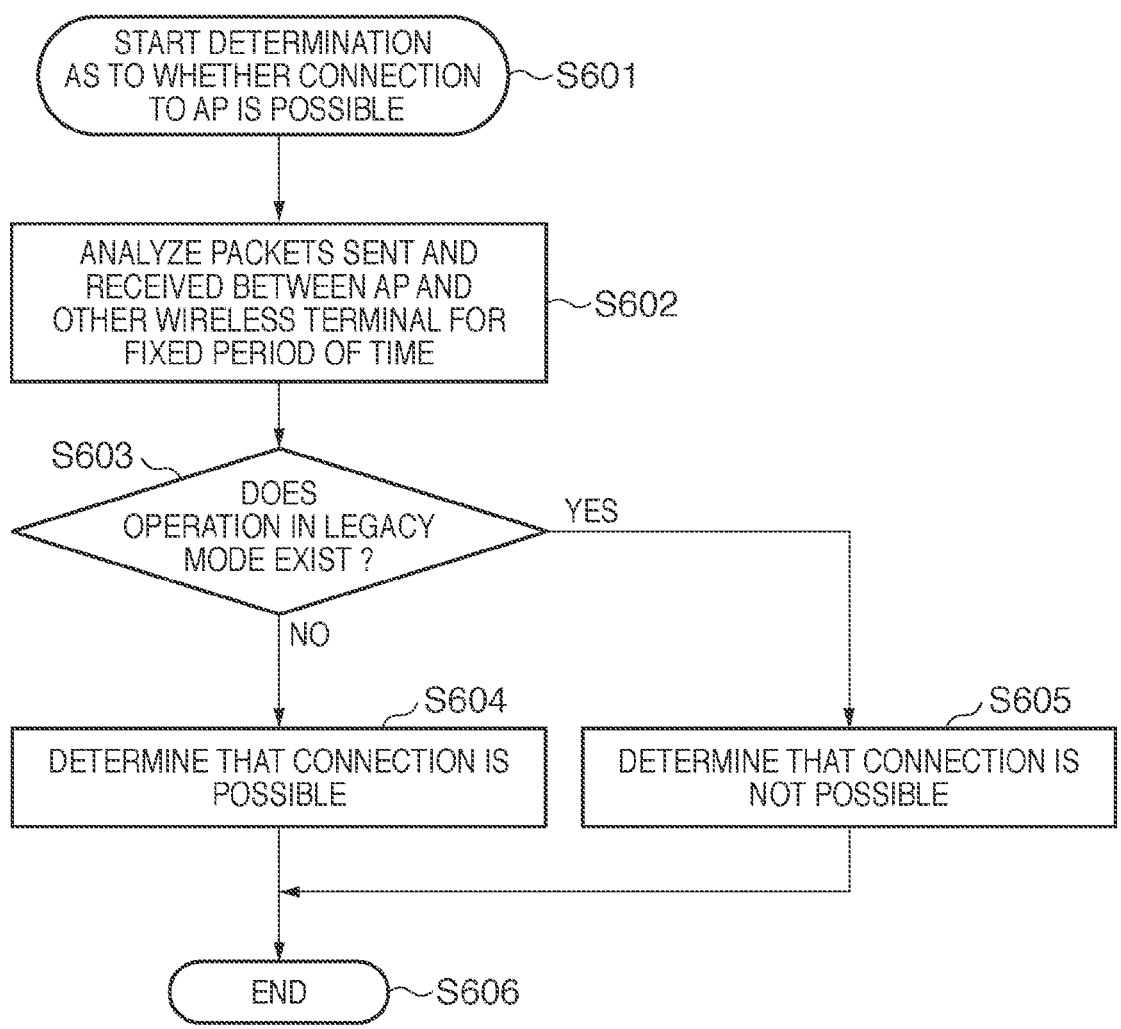

WIRELESS COMMUNICATION APPARATUS, METHOD OF CONTROLLING SAME AND STORAGE MEDIUM

This application is a continuation of U.S. patent application Ser. No. 12/890,583, which was filed Sep. 24, 2010, the contents of which are incorporated herein by reference.

BACKGROUND OF THE INVENTION

1. Field of the Invention

The present invention relates to a wireless communication apparatus, a method of controlling the wireless communication apparatus and a storage medium storing the related program.

2. Description of the Related Art

There are wireless transmission lines that serve for the transfer of data, and the wireless LAN standard IEEE 802.11 is applicable to ordinary wireless transmission lines. In the field of wireless communications such as wireless LAN communication, there is growing demand for data transfer requiring large-capacity and real-time transfer for data such as voice data and video data which is distributed by streaming. In order to satisfy this demand, systems incorporating QoS (Quality of Service) technology have been studied in the wireless LAN standard IEEE 802.11e and proposed. In order for a wireless terminal to perform wireless communication with another device in the infrastructure mode in a wireless communication system, a wireless connection to an access point is necessary. If it is desired to perform wireless communication that requires a large-capacity, real-time transmission in such case, then it is necessary to select the access point appropriately in accordance with the communication quality requested.

For instance, in Japanese Patent Document 1 (Japanese Patent Laid-Open No. 2007-110373), which is one example of a technique for selecting an access point, a wireless terminal measures the signal strength of wireless data, which it has received from an access point, before the access-point connection is established. Further, the wireless terminal measures interfering radio waves that affect the channel used by the access point. According to the technique described, communication efficiency for a case where wireless communication with an access point would be performed is predicted based upon the results of these two measurements and the connection is established upon selecting the access point for which the highest communication efficiency would be achieved.

In another example, according to Japanese Patent Document 2 (Japanese Patent Laid-Open No. 2008-42922), first a wireless terminal performs a channel scan, receives channel information transmitted from an access point and extracts the channel utilization rate. Next, on the basis of the channel information, the wireless terminal determines the maximum data transmission rate capable of being supported by the channel. The wireless terminal statistically processes channel occupancy probability within the scanning time interval and then calculates a hidden-terminal impact factor based upon the channel utilization rate, maximum data transmission rate and channel occupancy probability. The wireless terminal selects an access point based upon the wireless-terminal impact factor.

The technology described in Patent Document 3 (Japanese Patent Laid-Open No. 2007-165980) also is available as configurations for registering and deleting connections. According to this technique, the amount of accumulation of a transmission queue for every connection ID is monitored, QoS information is ascertained based upon such monitoring and a connection is registered or deleted accordingly.

SUMMARY OF THE INVENTION

In selecting an access point, it is desirable for the selection to be made appropriately in accordance with the service quality requested when a wireless terminal performs wireless communication. For example, in a case where it is desired to perform wireless communication with a service quality that requires a large-capacity and real-time transmission, it is not desirable to connect to an access point constructing a network in which the communication band is under stress. Further, in a wireless terminal that performs wireless communication with a service quality that does not necessarily require a real-time property, it is not necessarily required to select an access point having a special QoS function. However, if a connection is made to an access point that is limited in terms of the number of terminals it can accommodate, even though control that takes a real-time feature into consideration is possible, there are instances where a wireless terminal requesting another service quality will find it difficult to join the access point.

Furthermore, even in a case where multiple access points are being used in wireless communication schemes that differ from one another, it is desired that the wireless communication apparatus select the access point appropriately in accordance with the wireless communication scheme that is to be implemented now. For example, if, in a case where the capability of the wireless communication scheme desired to be used now by the wireless communication apparatus is high, an access point using a commensurate wireless communication scheme is not selected, then a communication quality not intended by the wireless communication apparatus will be imposed.

Conversely, if, in a case where the capability of the wireless communication scheme that is to be used now by the wireless communication apparatus is low, a connection is made to an access point that employs a high-performance communication scheme, then the result may be a reduction in the communication quality of other wireless devices belonging to the access point. Furthermore, in a case where communication in which access to a medium is prioritized is being performed, there are instances where the optimum channel cannot be selected based upon information relating solely to the state of channel congestion. For example, if the priority of a wireless terminal that is to perform wireless communication now is high, then, even though multiple wireless terminals may exist on the channel, there are instances where excellent wireless communication is possible because the priority of the first-mentioned wireless terminal is higher than that of the other wireless terminals.

In view of the foregoing, the present invention provides a technique whereby it is possible to select an access point efficiently in accordance with the service quality of wireless communication required by a wireless communication apparatus.

According to one aspect of the present invention, there is provided a wireless communication apparatus comprising: a search unit adapted to search for at least one base station to which the wireless communication apparatus will be wirelessly connected; a receiving unit adapted to receive a packet sent and received between the base station found by the search unit and another wireless communication apparatus; a demodulating unit adapted to demodulate first information contained in the packet received by the receiving unit, the first information indicating state of wireless communication between the base station and the other wireless communication apparatus; an analyzing unit adapted to analyze state of communication between the base station and the other wireless communication apparatus based upon result of demodulating the first information by the demodulating unit; a determination unit adapted to determine whether wireless communication requested by the wireless communication apparatus is possible with the base station, based upon second information, which is requested in a case where the wireless communication apparatus performs wireless communication with the base station, and result of analysis by the analyzing unit; and a selecting unit adapted to select a connection-destination base station, based upon result of determination by the determination unit, from the at least one base station found by the search unit.

In accordance with the present invention, it is possible to select an access point efficiently in accordance with the service quality of wireless communication required by a wireless communication apparatus.

Further features of the present invention will become apparent from the following description of exemplary embodiments with reference to the attached drawing).

BRIEF DESCRIPTION OF THE DRAWINGS

FIG. 1 is a diagram illustrating an example of the configuration of a wireless communication system to which the present invention is applicable;

FIGS. 3A to 3C are flowcharts for describing the flow of processing in the wireless communication apparatus;

FIGS. 5A to 5C are flowcharts for describing the flow of processing in the wireless communication apparatus according to a second embodiment of the present invention; and FIG. 6 is a flowchart illustrating a connection determination procedure according to the second embodiment.

DESCRIPTION OF THE EMBODIMENTS

Figure 2A:
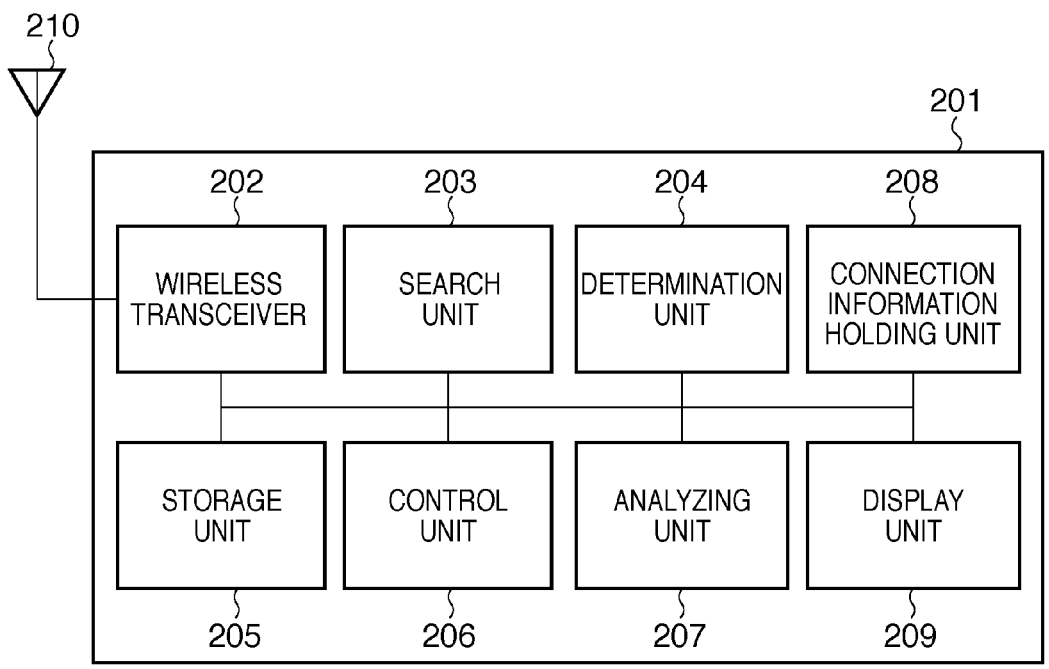
FIG. 2A is a block diagram illustrating the functional configuration of a wireless communication apparatus according to the present invention.

In the description that follows, IEEE 802.11 is taken as an example of a wireless standard. However, the scope of application of the present invention is not limited by this standard.

Reference will be had to FIG. 1 to describe an example of the configuration of a wireless communication system to which a wireless communication apparatus according to first and second embodiments can be applied. Reference numerals 101, 102 and 103 denote access points AP1, AP2 and AP3, respectively. All of these access points perform wireless communication with wireless terminals. Reference numerals 111, 112, 113, 114, 115, 116 and 117 denote wireless communication apparatuses STA1, STA2, STA3, STA4, STA5, STA6 and STA7, respectively. In the state illustrated, STA1 (111) and STA2 (112) perform wireless communication with AP1 (101), STA3 (113), STA4 (114) and STA5 (115) perform wireless communication with AP2 (102), and STA6 (116), STA7 (117) perform wireless communication with AP3 (103). Here it is assumed that AP1 (101), AP2 (102) and AP3 (103) are using channels 1ch, 7ch and 13ch, respectively.

Further, AP1 (101) is an access point that does not perform QoS communication. AP2 (102) does perform QoS communication. More specifically, AP2 (102) performs wireless communication using an EDCA scheme that prioritizes wireless packets by access category. Further, AP3 (103) performs QoS communication. This is an access point that employs the above-mentioned EDCA scheme and also carries out admission control through which it is possible to control whether to allow or deny participation of a wireless terminal.

Access category (AC) in wireless communication using the EDCA scheme is assumed to be as follows: For example, assume that the access category between STA3 (113) and AP2 (102) is access category 4 [STA3 (113)-AP2 (102): AC=4]. Similarly, assume that the access category between STA4 (114) and AP2 (102) is access category 0 [STA4 (114)-AP2 (102): AC=0]. Further, assume that wireless communication is being performed between STA5 (115) and AP2 (102) in access category 0 [STA5 (115)-AP2 (102): AC=0], between STA6 (116) and AP3 (103) in access category 5 [STA6 (116)-AP3 (103): AC=5], and between STA7 (117) and AP3 (103) in access category 4 [STA7 (117)-AP3 (103): AC=4]. In this case, AC=5 has a higher priority than AC=4, by way of example. In a system such as this, a wireless communication apparatus 201 searches for at least one base station (access point) to which a wireless connection is to be made. From the base stations found (at least one), the wireless communication apparatus 201 selects the base station for which wireless communication has been determined to be possible. For example, when it joins the network anew, the wireless communication apparatus 201 selects which access point among AP1 (101), AP2 (102) and AP3 (103) is the access point to which the connection should be made.

The functional configuration of the wireless communication apparatus 201 will be described with reference to FIG. 2A. A wireless transceiver 202 subjects digital data within a storage unit 205 to prescribed encoding and modulation processing and transmits the processed data to an antenna 210. The wireless transceiver 202 further subjects a signal received from the antenna 210 to prescribed decryption and demodulation processing and stores the processed data in the storage unit 205. For example, a packet sent and received between the found access point and another wireless communication apparatus is received via the antenna 210. The wireless transceiver 202 then demodulates the information contained in the received packet. This information is first information, which indicates the state of wireless communication between the access point and the other wireless communication apparatus.

A search unit 203 takes charge of processing for finding at least one base station, to which the wireless communication apparatus is to be wirelessly connected, and another wireless device. The storage unit 205 stores data received from wireless communication and data which is to undergo wireless transmission now. A control unit 206 exercises overall control of the wireless communication apparatus 201. An analyzing unit 207 analyzes a received packet and executes statistical processing that is based upon the type of packet. For example, based upon the result of demodulation of the demodulated information (first information), the analyzing unit 207 analyzes the state of communication between the access point and the other wireless communication apparatus and is capable of performing analysis using information relating to the communication scheme being employed and the priority. It should be noted that the analyzing unit 207 can be incorporated within the wireless transceiver 202.

A determination unit 204 determines whether good wireless communication is possible with an access point that is a candidate for wireless connection with the wireless communication apparatus 201. For example, using information (second information), which is requested in a case the wireless communication apparatus 201 is to perform wireless communication with an access point, and the result of analysis by the analyzing unit 207, the determination unit 204 determines whether wireless communication requested by the wireless communication apparatus 201 is possible with the access point that is the candidate for the wireless connection. A connection information holding unit 208 holds authentication information, which is necessary for a wireless connection, and information necessary for at least one of encryption and decryption of data. A display unit 209 is used to display information necessary for wireless communication as well as the state of wireless communication. The antenna 210 is used to send and receive signals to and from wireless media in wireless transmission and reception.

Figure 3B:
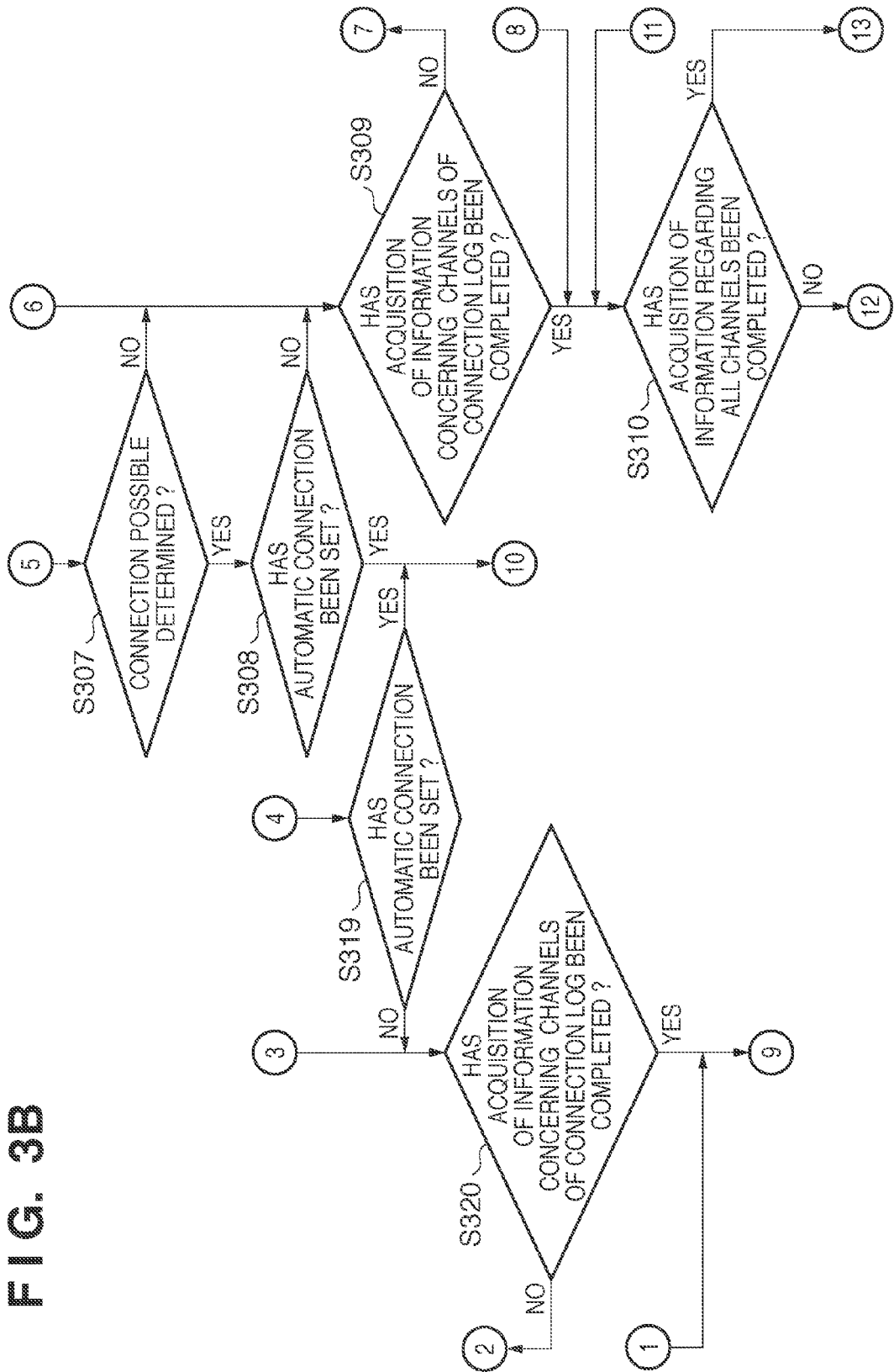
Figure 3C:
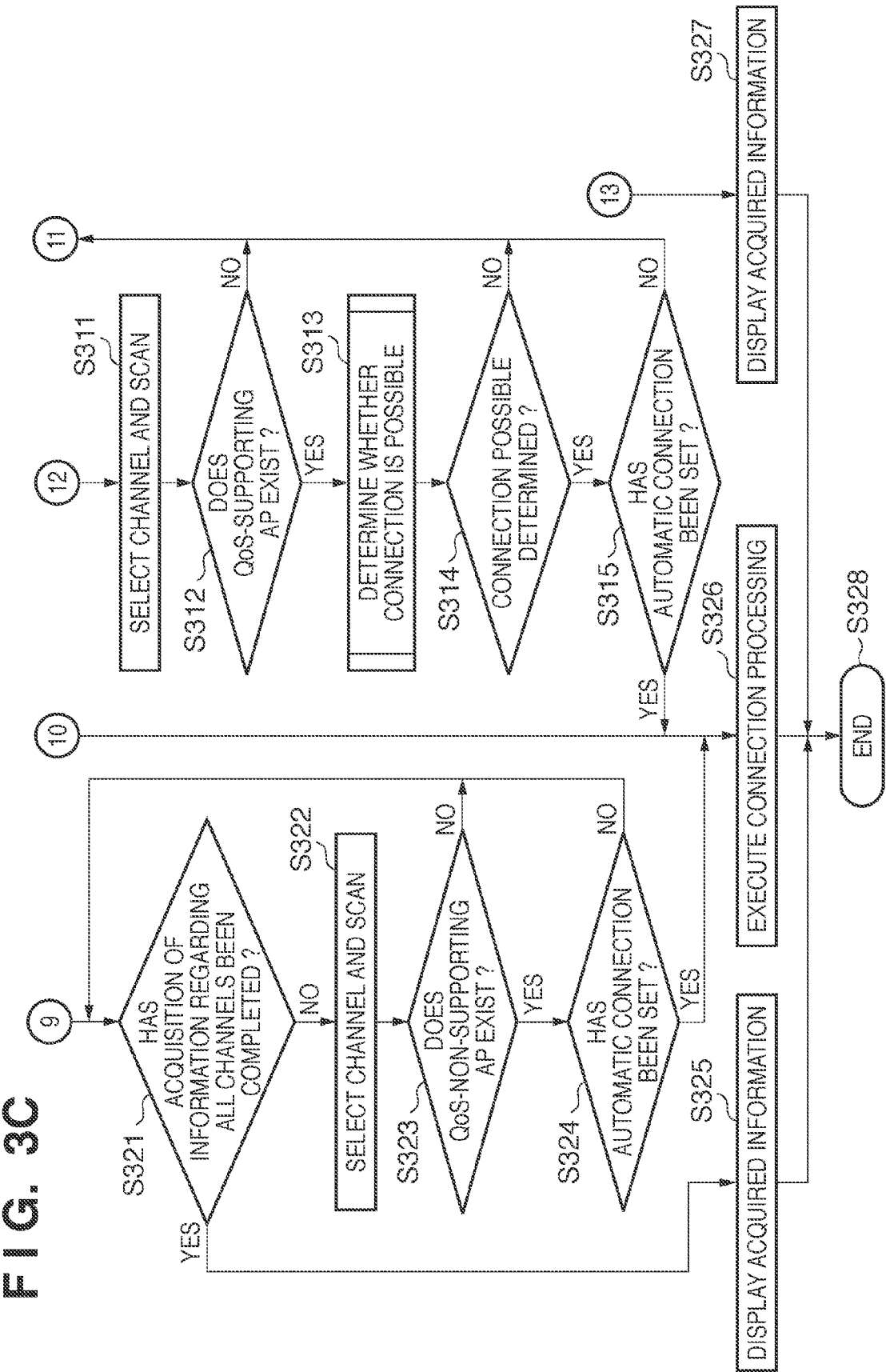

Described in the first embodiment is a method of selecting an access point based upon information indicating priority when a wireless communication medium is accessed and whether or not a maximum allowable number of terminals capable of communicating with the access point has been set. Reference will be had to FIGS. 3A to 3C to describe the flow of processing executed by the wireless communication apparatus 201 in a case where the start of wireless communication has been requested. Processing starts at step S301. For example, processing starts when the power supply of the wireless communication apparatus 201 is turned on or when the control unit 206 receives a wireless connection request.

At step S302, the wireless communication apparatus 201 determines whether the access category (AC), namely the priority of wireless communication which is now about to be carried out, is high. It should be noted that it is necessary to set beforehand which access category (AC) is determined to be high in wireless communication performed by the wireless communication apparatus 201. The access category (AC) may be set high for voice (AC=5) and video (AC=4), which have a priority higher than that of best effort (AC=0) normally used, or the access category may be set high only for voice (AC=5). For example, if the device to which the wireless communication apparatus 201 is connected is to perform a video transmission, then the initial setting of the wireless communication apparatus 201 should be such that the priority for communication performed by the wireless communication apparatus 201 is always made high. In a case where the access category (AC) of the wireless communication apparatus 201 is high, control proceeds to step S303. Otherwise, control proceeds to step S316.

At step S303, the wireless communication apparatus 201 determines whether there is a log of a past connection to an access point that supports QoS. If there is a log of a past connection to an access point that supports QoS, then control proceeds to step S304. If there is no log of such a connection, then control proceeds to step S310.

At step S304, the wireless communication apparatus 201 executes processing to search for an access point. Specifically, the wireless communication apparatus 201 executes processing for selecting one access point from among access points in the connection log that support QoS and investigating whether this access point is currently constructing a network on a previously existing channel.

If it is determined at step S305 that a QoS-supporting access point in the connection log is constructing a network on the found channel, then control proceeds to step S306. If the determination made at step S305 is that such an access point does not exist, then control proceeds to step S309.

At step S306, it is determined whether communication at the service quality requested by the wireless communication apparatus 201 will be possible when the wireless communication apparatus 201 performs communication upon being wirelessly connected to the QoS-supporting access point found at step S304. The details of this determination processing will be described later.

At step S307, control proceeds to step S308 if it has been determined at step S306 that connection is possible, or to step S309 if it has been determined at step S306 that connection is not possible.

At step S308, the wireless communication apparatus 201 determines whether an automatic connection setting has been made. Specifically, if an access point where communication at the required service quality is possible has been found, then the wireless communication apparatus 201 determines whether a setting to connect to this access point automatically in wireless communication to be performed now has been made.

Control proceeds to step S326 if the automatic connection setting has been made or to step S309 if the automatic connection setting has not been made.

At step S309, the wireless communication apparatus 201 determines whether information has been acquired on each channel where each QoS-supporting access point in the connection log has constructed a network. If information relating to all channels that had been used by QoS-supporting access points in the connection log has been acquired, then control proceeds to step S310. On the other hand, if there is a channel for which this information has not yet been acquired, then control returns to step S304. The information on each channel is whether or not a QoS-supporting access point exists and, if a QoS-supporting access point does exist, includes information acquired in order to determine whether connection is possible or not.

At step S310, it is determined whether information relating to all channels has already been acquired. If information relating to all channels has already been acquired, control proceeds to step S327. If there is a channel for which information has not yet been acquired, then control proceeds to step S311.

At step S311, the wireless communication apparatus 201 selects one channel for which channel-relating information has not yet been acquired and conducts a search to determine whether a QoS-supporting access point exists on this channel.

At step S312, control proceeds to step S313 if a QoS-supporting access point exists on the channel selected at step S311, or returns to step S310 if such an access point does not exist.

At step S313, it is determined whether communication at the service quality requested by the wireless communication apparatus 201 will be possible when the wireless communication apparatus 201 performs communication upon being wirelessly connected to the QoS-supporting access point found at step S312. The details of this determination processing will be described later.

At step S314, the wireless communication apparatus 201 delivers control to step S315 if it has been determined at step S313 that connection is possible, or returns control to step S310 if it has been determined at step S315 that connection is not possible.

At step S315, the wireless communication apparatus 201 determines whether an automatic connection setting has been made. Control proceeds to step S326 if the automatic connection setting has been made or returns to step S310 if the automatic connection setting has not been made.

At step S316, the wireless communication apparatus 201 determines whether there is a log of a past connection to an access point that does not support QoS. Here non-support of QoS means a state in which an access point is not being subjected to control on the number of connected terminals and, moreover, a packet transmission opportunity has not been assigned a priority conforming to the access category of the wireless packet. If there is a log of a past connection to an access point that does not support QoS, then control proceeds to step S317. If there is no log of such a connection, then control proceeds to step S321.

At step S317, the wireless communication apparatus 201 conducts search processing in order to select one access point from among access points in the connection log that do not support QoS and to investigate whether this access point is currently constructing a network on a channel on which communication had been performed previously.

If it is determined at step S318 that an access point not supporting QoS in the connection log exists on the found channel, then control proceeds to step S319. If the determination made at step S318 is that such an access point does not exist, then control proceeds to step S320.

At step S319, the wireless communication apparatus 201 determines whether an automatic connection setting has been made. Specifically, if an access point not supporting QoS has been found, the wireless communication apparatus 201 determines whether a setting to connect to this access point automatically has been made. Control proceeds to step S326 if the automatic connection setting has been made or to step S320 if the automatic connection setting has not been made.

At step S320, the wireless communication apparatus 201 determines whether information has been acquired on each channel where each QoS-non-supporting access point in the connection log has constructed a network. Here the information on each channel is information relating to whether or not a QoS-non-supporting access point exists on each channel. If information relating to all channels that had been used by QoS-non-supporting access points in the connection log has been acquired, then control proceeds to step S321. If there is a channel for which this information has not yet been acquired, then control returns to step S317.

At step S321, it is determined whether information relating to all channels has already been acquired. If information relating to all channels has already been acquired, control proceeds to step S325. If there is a channel for which information has not yet been acquired, then control proceeds to step S322.

At step S322, the wireless communication apparatus 201 selects one channel for which channel-relating information has not yet been acquired and conducts a search to determine whether a QoS-non-supporting access point exists on this channel.

At step S323, control proceeds to step S324 if a QoS-non-supporting access point exists on the channel selected at step S322, or returns to step S321 if such an access point does not exist.

At step S324, the wireless communication apparatus 201 determines whether an automatic connection setting has been made. Specifically, if an access point that does not support QoS has been found, then the wireless communication apparatus 201 determines whether a setting to connect to this access point automatically has been made. Control proceeds to step S326 if the automatic connection setting has been made or to step S321 if the automatic connection setting has not been made.

At step S325, the wireless communication apparatus 201 displays information relating to the acquired channel. If the automatic connection setting has not been made, the wireless communication apparatus 201 displays whether connection to the access point is possible or not in conformity with the access point and the channel information. In this way the user can select the connection-destination access point without any particular knowledge.

At step S326, the wireless communication apparatus 201 connects to the access point to which the connection has been determined to be possible. With regard to an access point for which there is a log of a previous connection, it is possible to make the connection to this access point upon acquiring from the connection log the information necessary at the time the wireless connection is established. With regard to an access point for which there is no log of a previous connection, the processing procedure necessary in order to establish the wireless connection is run automatically. Alternatively, it is permissible to display a message that prompts the user to enter the information necessary for the wireless connection to this access point.

At step S327, the wireless communication apparatus 201 displays the acquired channel-relating information. This processing is similar to that executed at step S325. All processing ends at step S328.

Figure 4:
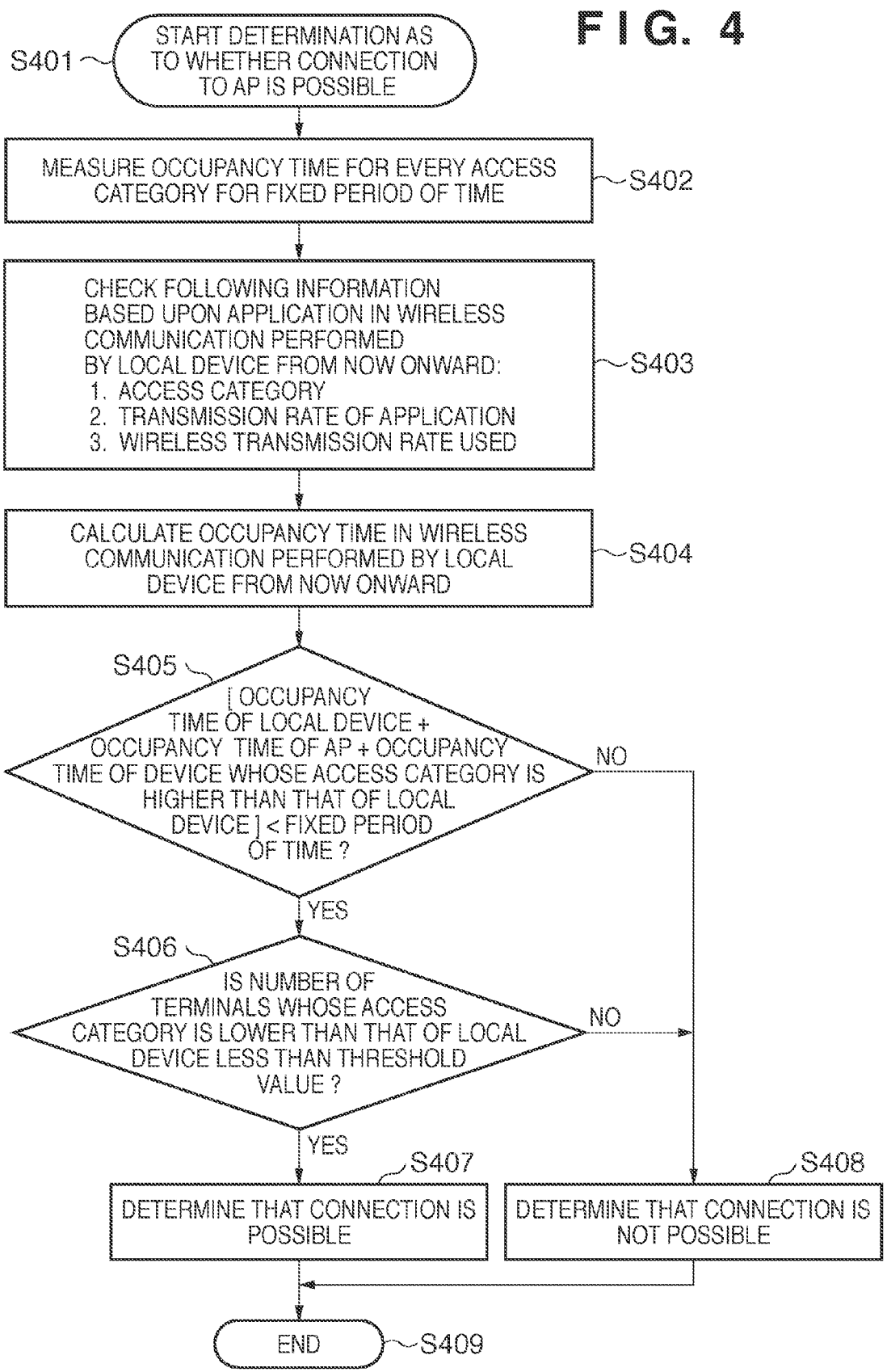
FIG. 4 is a flowchart illustrating a connection determination procedure.

Next, reference will be had to the flowchart of FIG. 4 to describe the details of the processing of steps S306 and S313 for determining whether connection is possible. Processing for determining whether connection is possible starts at step S401. At step S402, the wireless communication apparatus 201 monitors, for a fixed period of time, the channel that exists at the access point for which the connection determination is being made. More specifically, the wireless communication apparatus 201 demodulates and decrypts all packets that appear on this channel over a fixed period of time and measures the time the medium is used for every priority [access category (AC)]. The wireless communication apparatus 201 then expresses, as occupancy time, the time the wireless device requires use of the medium in the fixed period of time. The fixed period of time mentioned here is required to be set specifically beforehand. For example, it is permissible to use a multiple of the period of the access-point alarm packet or some other value.

At step S403, the wireless communication apparatus 201 (the local device) checks information in wireless communication about to be performed now. The information checked is the access category, namely the priority prevailing when wireless communication is performed now, the transmission rate of the application that sends and receives data using the wireless communication apparatus, and the wireless transmission rate used by the wireless communication apparatus.

At step S404, the wireless communication apparatus 201 calculates the communication-medium occupancy time necessary for wireless communication to be performed now. Specifically, this calculation is performed based upon the transmission rate of the application and the wireless transmission rate used by the wireless communication apparatus 201, these having been checked at step S403 above.

At step S405, occupancy time over which use of the wireless communication apparatus 201 is scheduled, occupancy time in another wireless device already connected to an access point that is a connection candidate and occupancy time of the access point are adopted as determination indicators. With regard to other wireless devices, only a wireless device whose priority is equal to that of the wireless communication apparatus 201 or a wireless device whose priority (access category) is higher than that of the wireless communication apparatus 201 is adopted as a target. The reason for this is that the wireless communication apparatus 201 has a higher probability that it can occupy the medium than another wireless device having a priority lower than that of the wireless communication apparatus 201, and the influence inflicted on the wireless communication quality of the wireless communication apparatus 201 by the other wireless device having the low priority is less.

Let is represent the occupancy time of the wireless communication apparatus 201, and let to represent the occupancy time (base-station occupancy time) of the medium used by the access point. Let to represent the occupancy time necessary for other wireless devices (the number of which is N) in order to achieve a wireless connection having a priority greater than or equal to that of the wireless communication apparatus 201, and let T represent the above-mentioned fixed time period (reference time).

$$T > t_s + t_a + \sum_{n=1}^{N} t_n \quad (1)$$

Here N represents the number of wireless terminals having a priority equal to that of the wireless communication apparatus 201 and greater than that of the wireless communication apparatus 201. If the sum of the times on the right side of expression (1) is less than the reference time, control proceeds to step S406. On the other hand, if the sum of the times on the right side of expression (1) is equal to or greater than the reference time, control proceeds to step S408.

At step S406, the wireless communication apparatus 201 compares the number of other wireless devices, which are connected to the access point that is a connection candidate and which have a priority lower than that of the wireless communication apparatus 201 (the local device), and a preset threshold value relating to the number of wireless devices. Let M represent the total number of other wireless devices connected to the access point by wireless communication, and let N represent the number of wireless terminals having a priority equal to that of the wireless communication apparatus 201 and greater than that of the wireless communication apparatus 201. A number m of other wireless devices having a priority lower than that of the wireless communication apparatus 201 can be found by the calculation M-N. If the number m of other wireless devices having a priority lower than that of the wireless communication apparatus 201 (the local device) is less than a threshold value indicating an allowable number of connectable devices, control proceeds to step S407. On the other hand, if the number m of other wireless devices having the lower priority is greater than the threshold value, then control proceeds to step S408.

Other wireless devices having a priority lower than that of the wireless communication apparatus 201 have little influence upon the wireless communication of the wireless communication apparatus 201. When the number of other wireless devices becomes large, however, access to the wireless communication medium develops contention and the probability that the wireless communication apparatus 201 will not be able to use the wireless communication medium when it desires to inevitably rises. Accordingly, a threshold value is provided beforehand in relation also to the allowable number of wireless devices having a priority lower than that of the wireless communication apparatus 201. In a case where a number of devices exceeding this threshold value have already been connected to the access point, at step S408 the wireless communication apparatus 201 determines that connection at the requested quality of service to the access point that is the connection candidate is not possible this time. On the other hand, if the number of other wireless devices having a priority lower than that of the wireless communication apparatus 201 is less than the threshold value, then, at step S407, the wireless communication apparatus 201 determines that connection at the requested quality of service to the access point that is the connection candidate is possible this time. Processing for determining whether connection is possible or not ends at step S409.

The foregoing processing is a detailed processing flow, which is for determining whether connection is possible to an access point, executed by the wireless communication apparatus 201. It should be noted that in the above-described processing, the occupancy time of the wireless communication medium for every access category is monitored directly and the determination is made based upon the directly monitored occupancy time. However, if occupancy time cannot be monitored directly, it is possible to apply the following method: For example, it is possible to monitor the transmission rate used by the wireless packets and monitor packet size and calculate the occupancy time of the wireless communication medium based upon the monitored transmission rate and packet size. A further method is to use NAV time information contained in the wireless packet. The effects according to the first embodiment of the present invention can be expected regardless of which method is used.

In accordance with this embodiment, it is possible to carry out efficient selection of an access point in accordance with the quality of service of wireless communication required for a wireless communication apparatus.

In the first embodiment set forth above, a method of determining whether a connection is possible based upon the priority of wireless communication is described. In a second embodiment, an arrangement for performing the determination as to whether connection is possible in accordance with the scheme of wireless communication is described. The wireless communication apparatus 201 is applicable to a wireless communication system in which at least two different wireless communication schemes can be employed. This embodiment will be described taking IEEE 802.11n (referred to below as the "high-speed mode"), which is capable of high-speed communication, and IEEE 802.11a or IEEE 802.11g or IEEE 802.11b (referred to below as the "legacy mode") as the wireless communication schemes. It should be noted that functions necessary for the wireless communication apparatus 201 are the same as those described in FIG. 2A.

Figure 5B:
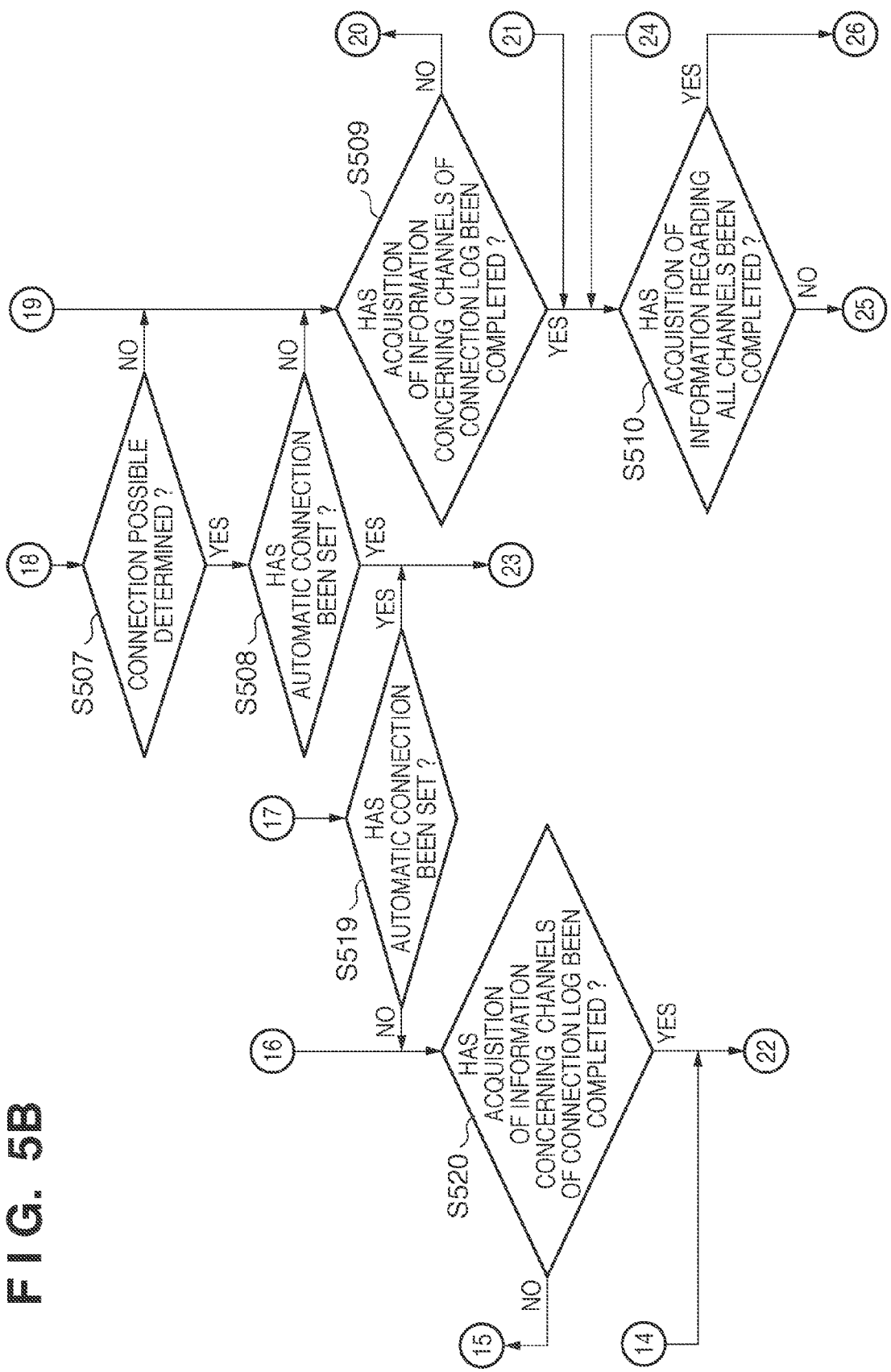

Reference will be had to FIGS. 5A to 5C to describe the flow of processing executed by the wireless communication apparatus according to the second embodiment. Processing starts at step S501. For example, processing starts when the power supply of the wireless communication apparatus 201 is turned on or when the control unit 206 receives a wireless connection request.

At step S502, the wireless communication apparatus 201 determines the communication scheme of wireless communication about to be performed now. More specifically, the system operates in the high-speed mode or in the legacy mode. Control proceeds to step S503 in case of operation in the high-speed mode and to step S516 in case of operation in the legacy mode.

At step S503, the wireless communication apparatus 201 determines whether there is a log of a past connection to an access point that operated in the high-speed mode. If there is a log of a past connection to an access point that operated in the high-speed mode, then control proceeds to step S504. If there is no log of such a connection, then control proceeds to step S510.

At step S504, the wireless communication apparatus 201 executes search processing for selecting one access point from among access points in the connection log that operate in the high-speed mode and investigating whether this access point is currently constructing a present network on channel on which communication has been performed previously. A step S505, it is determined from the result of search processing at step S504 whether an access point that operates in the high-speed mode is constructing a network. Even if the access point coincides with one in the connection log, it is not included among high-speed-mode access points in a case where it is operating in the legacy mode this time. If an applicable access point exists, control proceeds to step S506. If it does not exist, then control proceeds to step S509. At step S506, the wireless communication apparatus 201 determines whether communication that will perform the expected operation will be possible when the wireless communication apparatus 201 performs communication upon being wirelessly connected to the high-speed access point. The details of this determination processing will be described later.

At step S507, control proceeds to step S508 if it has been determined at step S506 that connection is possible, or to step S509 if it has been determined at step S506 that connection is not possible. At step S508, the wireless communication apparatus 201 determines whether an automatic connection setting has been made. Specifically, if an access point has been found, then the wireless communication apparatus 201 determines whether a setting has been made to connect automatically to the access point determined to be connectable at step S506. Control proceeds to step S526 if the automatic connection setting has been made or to step S509 if the automatic connection setting has not been made.

At step S509, the wireless communication apparatus 201 determines whether information has been acquired on each channel where a high-speed-mode access point in the connection log constructed a network in the past. The information on each channel is whether or not an access point that operates in the high-speed mode exists and, if an access point that operates in the high-speed mode does exist, includes information acquired in order to determine whether connection is possible or not. If information relating to all channels that had been used by high-speed-mode access points in the connection log has been acquired, then control proceeds to step S510. If there is a channel for which this information has not yet been acquired, then control returns to step S504.

At step S510, it is determined whether information relating to all channels has already been acquired. If information relating to all channels has already been acquired, control proceeds to step S527. If there is a channel for which information has not yet been acquired, then control proceeds to step S511.

At step S511, the wireless communication apparatus 201 selects one channel for which channel-relating information has not yet been acquired and conducts a search to determine whether a high-speed-mode access point exists on this channel.

At step S512, control proceeds to step S513 if a high-speed-mode access point exists on the channel selected at step S511, or returns to step S510 if such an access point does not exist. At step S513, it is determined whether communication which will perform the operation expected by the wireless communication apparatus 201 will be possible when the wireless communication apparatus 201 performs communication upon being wirelessly connected to the high-speed-mode access point found at step S512. The details of this determination processing will be described later.

At step S514, control proceeds to step S515 if it has been determined at step S514 that connection is possible, or to step S510 if it has been determined at step S514 that connection is not possible. At step S515, the wireless communication apparatus 201 determines whether an automatic connection setting has been made. Control proceeds to step S526 if the automatic connection setting has been made or returns to step S510 if the automatic connection setting has not been made.

At step S516, the wireless communication apparatus 201 determines whether there is a log of a past connection to an access point that operates in the legacy mode. If there is a log of a past connection to an access point that operates in the legacy mode, then control proceeds to step S517. If there is no log of such a connection, then control proceeds to step S521. At step S517, the wireless communication apparatus 201 conducts search processing in order to select one access point from among legacy-mode access points in the connection log and to investigate whether this access point is currently constructing a network on a channel on which communication had been performed previously. If it is determined at step S518 that a legacy-mode access point in the connection log exists on the found channel, then control proceeds to step S519. If the determination made at step S518 is that such an access point does not exist, then control proceeds to step S520.

At step S519, the wireless communication apparatus 201 determines whether an automatic connection setting has been made. Specifically, if a legacy-mode access point has been found, the wireless communication apparatus 201 determines whether a setting to connect to this access point automatically has been made. Control proceeds to step S526 if the automatic connection setting has been made or to step S520 if the automatic connection setting has not been made.

At step S520, the wireless communication apparatus 201 determines whether information has been acquired on each channel where each legacy-mode access point in the connection log has constructed a network. Here the information on each channel is information relating to whether or not a legacy-mode access point exists on each channel. If information relating to all channels that had been used by legacy-mode access points in the connection log has been acquired, then control proceeds to step S521. If there is a channel for which this information has not yet been acquired, then control returns to step S517.

At step S521, it is determined whether information relating to all channels has already been acquired. If information relating to all channels has already been acquired, control proceeds to step S525. If there is a channel for which information has not yet been acquired, then control proceeds to step S522.

At step S522, the wireless communication apparatus 201 selects one channel for which channel-relating information has not yet been acquired and conducts a search to determine whether a legacy-mode access point exists on this channel.

At step S523, control proceeds to step S524 if a legacy-mode access point exists on the channel selected at step S522, or returns to step S521 if such an access point does not exist.

At step S524, the wireless communication apparatus 201 determines whether an automatic connection setting has been made. Specifically, if an access point that operates in the legacy mode has been found, then the wireless communication apparatus 201 determines whether a setting to connect to this access point automatically has been made. Control proceeds to step S526 if the automatic connection setting has been made or to step S521 if the automatic connection setting has not been made.

At step S525, the wireless communication apparatus 201 displays information relating to the acquired channel. If, in a case where the automatic connection setting has not been made, the wireless communication apparatus 201 finds an access point that has been determined to be connectable, then the wireless communication apparatus 201 displays that connection is possible in conformity with the access point and channel information. If an access point that is not connectable has been found, then the wireless communication apparatus 201 displays whether connection to the access point is possible in conformity with the access point and channel information. In this way the user can select the connection-destination access point without any particular knowledge.

At step S526, the wireless communication apparatus 201 connects to the access point to which the connection has been determined to be possible. With regard to an access point for which there is a log of a previous connection, it is possible to make the connection to this access point upon acquiring from the connection log the information necessary at the time the wireless connection is established. With regard to an access point for which there is no log of a previous connection, the processing procedure necessary in order to establish the wireless connection is run automatically. Alternatively, it is permissible to display a message that prompts the user to enter the information necessary for the wireless connection to this access point.

At step S527, the wireless communication apparatus 201 displays the acquired channel-relating information. This processing is similar to that executed at step S525. All processing ends at step S528.

Next, reference will be had to the flowchart of FIG. 6 to describe the details of the processing of steps S506 and S513 for determining whether connection is possible. Processing for determining whether connection is possible starts at step S601. At step S602, the wireless communication apparatus 201 analyzes, for a fixed period of time, the channel where the access point for which the connection determination is being made exists. A packet sent and received between the access point and another wireless communication apparatus contains information for specifying the wireless communication scheme as first information indicating the state of wireless communication. Further, information for specifying the wireless communication scheme is contained in information requested in a case where the wireless communication apparatus 201 performs wireless communication with the access point. Using the information for specifying the wireless communication scheme, the wireless communication apparatus 201 demodulates and decrypts all packets that appear on this channel over a fixed period of time and performs an analysis as to whether a wireless terminal performing communication in the legacy mode exists at an access point that operates in the high-speed mode.

If it is found at step S603 that there is a terminal performing wireless communication in the legacy mode with a connection-candidate access point of the wireless communication apparatus 201, control proceeds to step S605. If such a terminal does not exist, then control proceeds to step S604.

At step S604, the wireless communication apparatus 201 determines that connection to the access point that is the connection candidate is possible this time. At step S605, on the other hand, the wireless communication apparatus 201 determines that connection to the access point that is the connection candidate is not possible this time.

Processing ends at step S606. It should be noted that in the second embodiment, the connection-destination access point is selected focusing attention on the band utilization efficiency of wireless communication. That is, if, in a case where the wireless communication apparatus 201 desires operation at an access point that operates in the high-speed mode, another wireless terminal that operates in the legacy mode exists, then a band assurance mechanism the purpose of which is co-existence with the wireless communication apparatus operates and communication efficiency declines. In accordance with this embodiment, an effect that avoids a decline in communication efficiency is obtained.

Figure 2B:
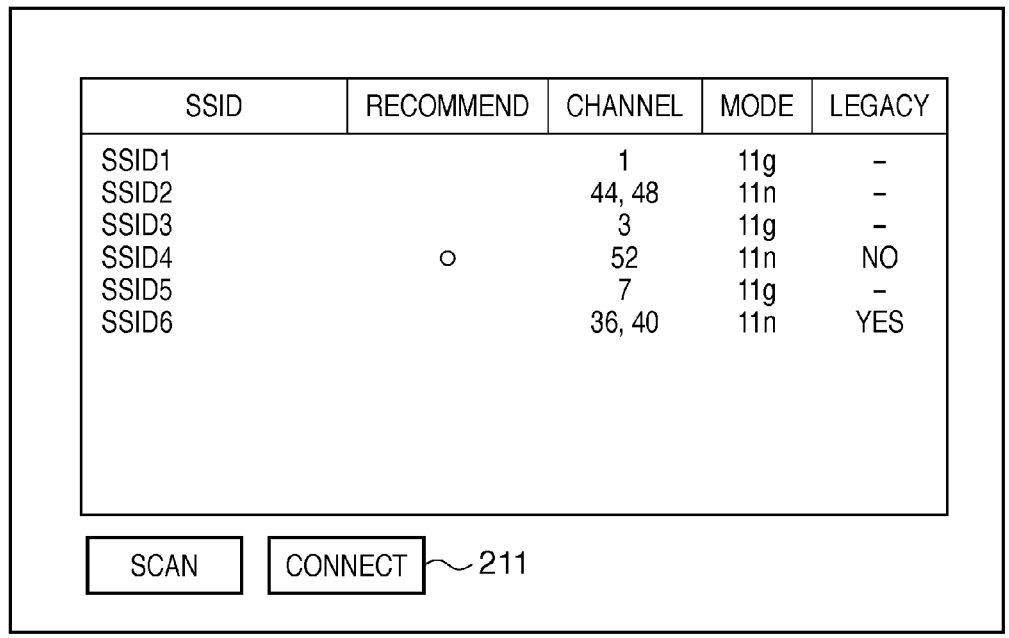
FIG. 2B is a diagram useful in describing an information display method in illustrative fashion.

The first or second embodiment has processing for displaying information. In this case, as shown in FIG. 2B, it is possible to display a determination result as recommendation information together with the SSID constructed by the access point. That is, without performing any particular operation and without possessing any particular knowledge, the user can select an access point connected in order to perform wireless communication with good communication quality or at a high communication-band utilization efficiency. For example, the display unit 209 has a designation input section 211 which, in a case where a plurality of base stations are being displayed as selectable base stations on the display unit 209, is for accepting a user input for designating one base station.

In accordance with this embodiment, efficient access-point selection can be carried out in accordance with the quality of service of wireless communication required for a wireless communication apparatus.

Further, the present invention is implemented by executing the following processing: Software (a program) for implementing the functions of the above-described embodiments is supplied to a system or apparatus via a network or various storage media, and the system or apparatus (or CPU or MPU) reads out and executes the program.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-247106, filed Oct. 27, 2009, which is hereby incorporated by reference herein in its entirety.

What is claimed is:

1. A communication apparatus comprising:
   an acquisition unit configured to acquire first access category information to be used in communication between a base station and another communication apparatus, wherein said acquisition unit further acquires first communication band information to be used in the communication between the base station and the other communication apparatus; and
   a connection unit configured to perform connection process to the base station, in accordance with second access category information to be used in communication between the base station and the communication apparatus, and the first access category information acquired by said acquisition unit, wherein said connection unit performs the connection process to the base station, in accordance with the second access category information, second communication band information to be used in the communication between the base station and the communication apparatus, the first access category information and the first communication band information.

2. The apparatus according to claim 1, further comprising a selection unit configured to select, among a plurality of base stations, a base station as a connection-destination in the connection process to be performed by said connection unit, in accordance with the second access category information and the first access category information.

3. The apparatus according to claim 2, wherein said selection unit accepts a user input for selecting the base station, as the connection-destination in the connection process to be performed by said connection unit, among the plurality of base stations.

4. The apparatus according to claim 1, wherein the first communication band information includes information of occupancy time during which a wireless communication medium is occupied in the communication between the base station and the other communication apparatus, and the second communication band information includes information of occupancy time during which a wireless communication medium is occupied in the communication between the base station and the communication apparatus.

5. The apparatus according to claim 1, wherein said connection unit performs connection process to the base station, in a case where sum of a first time included in the first communication band information and a second time included in the second communication band information is less than a predetermined reference time.

6. The apparatus according to claim 1, wherein said connection unit performs the connection process to the base station, in accordance with the second access category information, the first access category information, the number of other communication apparatuses being connected to the base station.

7. The apparatus according to claim 1, wherein said connection unit performs the connection process to the base station, in accordance with the second access category information, the first access category information, and a communication scheme between the base station and the other communication apparatus.

8. The apparatus according to claim 1, further comprising a holding unit configured to hold encryption information and authentication information, which are used in communication with the base station, wherein said connection unit performs the connection process to the base station based on the encryption information and the authentication information held by said holding unit.

9. A method of controlling a communication apparatus, the method comprising:

an acquisition step of acquiring first access category information to be used in communication between a base station and another communication apparatus, wherein the acquisition step further acquires first communication band information to be used in the communication between the base station and the other communication apparatus; and a connection step of performing connection process to the base station, in accordance with second access category information to be used in communication between the base station and the communication apparatus, and the first access category information acquired in the acquisition step, wherein the connection step performs the connection process to the base station, in accordance with the second access category information, second communication band information to be used in the communication between the base station and the communication apparatus, the first access category information and the first communication band information.

10. A non-transitory computer-readable storage medium storing a computer program for controlling a communication apparatus, wherein the computer program causes a computer to execute the following:

an acquisition step of acquiring first access category information to be used in communication between a base station and another communication apparatus, wherein the acquisition step further acquires first communication band information to be used in the communication between the base station and the other communication apparatus; and a connection step of performing connection process to the base station, in accordance with second access category information to be used in communication between the base station and the communication apparatus, and the first access category information acquired in the acquisition step, wherein the connection step performs the connection process to the base station, in accordance with the second access category information, second communication band information to be used in the communication between the base station and the communication apparatus, the first access category information and the first communication band information.

* * * * *